United States Patent
Zec et al.

(10) Patent No.: US 9,709,122 B2
(45) Date of Patent: Jul. 18, 2017

(54) ROLL-OFF PISTON FOR AN AIR SPRING ROLLING-LOBE FLEXIBLE MEMBER

(71) Applicant: ContiTech Luftfedersysteme GmbH, Hannover (DE)

(72) Inventors: Djuradj Zec, Hannover (DE); Boris Balachonzew, Garbsen (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 14/250,013

(22) Filed: Apr. 10, 2014

(65) Prior Publication Data

US 2014/0252703 A1 Sep. 11, 2014

Related U.S. Application Data

(63) Continuation of application No. PCT/EP2012/066727, filed on Aug. 29, 2012.

(30) Foreign Application Priority Data

Oct. 10, 2011 (DE) ........................ 10 2011 054 330

(51) Int. Cl.
  *F16F 9/04* (2006.01)
  *F16F 9/05* (2006.01)
  *B60G 11/27* (2006.01)

(52) U.S. Cl.
  CPC .............. *F16F 9/057* (2013.01); *B60G 11/27* (2013.01); *B60G 2202/152* (2013.01); *F16F 2224/00* (2013.01)

(58) Field of Classification Search
  CPC ..... B60G 11/27; B60G 2202/152; F16F 9/05; F16F 9/56; F16F 9/057; F16F 2224/00
  See application file for complete search history.

(56) References Cited

U.S. PATENT DOCUMENTS

| | | | |
|---|---|---|---|
| 3,343,831 A * | 9/1967 | Cripe | 267/35 |
| 6,422,543 B1 * | 7/2002 | Fejerdy | 267/122 |
| 6,682,058 B1 | 1/2004 | Nemeth et al. | |
| 7,497,423 B2 * | 3/2009 | Myers | 267/64.27 |
| 8,061,691 B2 | 11/2011 | Levy et al. | |
| 8,123,202 B2 * | 2/2012 | Eise et al. | 267/64.21 |
| 2006/0226586 A1 * | 10/2006 | Levy | 267/64.27 |

(Continued)

FOREIGN PATENT DOCUMENTS

| | | | |
|---|---|---|---|
| DE | 42 13 676 A1 | 10/1993 | |
| DE | EP 1300264 A2 * | 4/2003 | B60G 11/28 |

(Continued)

OTHER PUBLICATIONS

Machine translation of EP 1300264 (no date).*

(Continued)

*Primary Examiner* — Nicholas J Lane
(74) *Attorney, Agent, or Firm* — Walter Ottesen, P.A.

(57) ABSTRACT

A roll-off piston made of plastic is for an air spring rolling-lobe flexible member (19) of the air spring. The roll-off piston (1) is configured as a plunge piston and has a preferably central support (2) for a stop buffer (3) acting in an axial direction of the air spring. The support (2) is preferably made of steel and can be received in a recess in the roll-off piston. The recess is of complementary configuration to the shape of the support and can be connected to the piston.

18 Claims, 3 Drawing Sheets

(56) References Cited

U.S. PATENT DOCUMENTS

| | | | |
|---|---|---|---|
| 2008/0211150 A1* | 9/2008 | Levy et al. | 267/64.27 |
| 2009/0160110 A1* | 6/2009 | Eise | F16F 9/057 |
| | | | 267/64.21 |
| 2010/0127438 A1* | 5/2010 | Eise | F16F 9/057 |
| | | | 267/124 |
| 2012/0313304 A1* | 12/2012 | Street | B60G 11/27 |
| | | | 267/122 |
| 2014/0054833 A1* | 2/2014 | Neitzel | B60G 11/27 |
| | | | 267/64.27 |
| 2014/0167337 A1* | 6/2014 | Ramsey et al. | 267/124 |
| 2016/0121682 A1* | 5/2016 | Leonard | F16F 9/049 |
| | | | 280/124.161 |

FOREIGN PATENT DOCUMENTS

| | | |
|---|---|---|
| EP | 1 450 066 A2 | 8/2004 |
| EP | 1 862 335 A1 | 12/2007 |

OTHER PUBLICATIONS

International Search Report dated Jan. 2, 2013 of international application PCT/EP2012/066727 on which this application is based.

\* cited by examiner

ROLL-OFF PISTON FOR AN AIR SPRING ROLLING-LOBE FLEXIBLE MEMBER

CROSS REFERENCE TO RELATED APPLICATIONS

This application is a continuation application of international patent application PCT/EP2012/066727, filed Aug. 29, 2012, designating the United States and claiming priority from German application 10 2011 054 330.9, filed Oct. 10, 2011, and the entire content of both applications is incorporated herein by reference.

FIELD OF THE INVENTION

The invention relates to a roll-off piston composed of plastic for an air spring rolling-lobe flexible member, wherein the roll-off piston is configured as a plunge piston and has a preferably centrally arranged support for a stop buffer acting in an axial direction of the air spring.

BACKGROUND OF THE INVENTION

Various types of such roll-off pistons are known. On the one hand, there are relatively heavy roll-off pistons made of steel sheet with a fully usable interior volume and with an end stop, that is, a "buffer support", namely a support for a stop buffer acting substantially in an axial direction of the air spring. The steel sheet roll-off piston is produced as a deep drawn part with a conical sealing seat for the flexible member receptacle and has a welded-in base part with a welded-on supporting tube. Although a piston of this kind with a buffer support made of steel sheet has sufficient stability to accept even relatively high loads or even, for emergency running, to accept bottoming of the vehicle body, the overall component is correspondingly heavy and expensive to produce.

On the other hand, there are relatively light one-piece plastic pistons. For reasons of weight saving, such plastic pistons are now also preferred by manufacturers of trucks. In terms of the load-carrying capacity of the buffer support, however, even pistons produced from glass fiber reinforced plastic can hardly reach the values for strength, endurance and temperature stability of buffer supports in the case of steel pistons. Moreover, for precisely these reasons, the interior volume of plastic pistons cannot be used or cannot be used to the full. Where it is not possible to use the interior volume or where it can only be used partially, however, such designs have a loss of comfort as a disadvantage. The springing is then relatively hard.

The alternatives in the prior art are then two-part plastic pistons with a usable interior volume but without a buffer support, in which the overall design of the chassis must then be reconfigured in such a way that the missing buffer support is replaced by other measures. An air spring piston of this kind is disclosed by EP 1 862 335 B1, for example. There, the air spring piston consists of a cup-shaped part and of a covering part, which are butt-welded together in the region of the walls thereof. Here, the cup-shaped part has a base wall which has an insert for connection to the vehicle axle. The disadvantage here is, as explained, the lack of an end stop (buffer support).

United States patent application publication 2010/0127438 also discloses a plunge piston designed as a hollow body for an air spring, consisting of two parts connected airtightly to one another, namely of a pot-shaped bottom part with a base and shell and of a top part. Here too, there is no end stop provided.

SUMMARY OF THE INVENTION

It is therefore an object of the invention to provide a roll-off piston which is light and simple to produce and the interior volume of which is fully available for use for suspension and in which an end stop/buffer support is also integrated, that is, in which there is a successful combination of optimum air volume and comfort and the provision of an integrated end stop in the air spring system.

Here, the support is made of a material which has a significantly higher strength than the plastic of the roll-off piston, that is, also has a significantly higher resistance to heat, that is, temperature stability. For this purpose, the support can be received or inserted in a modular manner in a recess in the roll-off piston. The recess is of complementary configuration to the shape of the support, and can be connected positively and/or frictionally to or in the recess. The support is preferably made of steel or some other suitable metal.

The advantage of lightweight construction (plastic piston) is thereby combined with the requirements on a buffer support which can take maximum loads and maintains uniform load bearing capacity over its service life.

Another advantageous embodiment is that the roll-off piston is configured as a hollow plunge piston which comprises a pot-shaped piston bottom part and a piston top part connected airtightly to the piston bottom part and configured as a cover and the interior of which communicates with the interior of the air spring, and which has the following further features: a part of the recess of complementary configuration to the shape of the support is configured as part of the piston top part and so as to start from the cover thereof, while the other part of the recess is designed as part of the pot-shaped piston bottom part and so as to start from the base of the bottom part, wherein both parts of the recess adjoin one another and coact to receive the support.

By virtue of the fact that part of the recess is configured as part of the piston top part and the other part of the recess is configured as part of the pot-shaped piston bottom part and so as to start from the bottom thereof, wherein both parts of the recess coact with the support to accept substantially axially acting forces in customary installation situations, a two-part plastic piston is formed, the top part of which can have an integrated sealing cone for an air spring rolling-lobe flexible member and which, when the top part and bottom part are connected in an airtight manner, forms a usable interior volume and an extraordinarily lightweight construction with very good strength properties.

Another advantageous embodiment is realized in that the support and the recess are of complementary cylindrical or tubular configuration and are arranged centrally within the roll-off piston. Short tubes are also capable of bearing enormous loads in the longitudinal direction and, as hollow bodies, are nevertheless very light.

Another advantageous embodiment is realized in that the interior of the roll-off piston is reinforced with rib-type reinforcing elements. It is thereby possible to accept even transverse forces or obliquely acting buffer forces without problems. With such an embodiment, it may also be possible further to reduce the wall thickness of the tubular support parts. This effect is further enhanced by the fact that the rib-type reinforcing elements are arranged in a star shape or ray shape and rib-type reinforcing elements are also provided in the annular spaces between the respective support part and the piston wall or cover wall.

Another advantageous embodiment is realized in that the airtight connection between the piston bottom part and the piston top part is formed at the outer piston shell, while the parts of the recess merely rest one against the other. On the one hand, this results in a defined, statically determined force absorption without the typical stresses within the component, which are often damaging to plastic materials in the case of continuous loading. On the other hand, this is advantageous in the case of rotational friction welding, which is often employed with concentric plastic parts. If namely such a connection is formed only at the outer piston shell, the problems which occur due to different peripheral speeds during the rotational welding of different diameters are no longer present.

Other types of connection can also be used, for example, screwed, clipped, latched or crimped joints provided with seals. However, the latter are often more expensive and more awkward to handle during assembly, and therefore the easily produced butt weld formed by friction welding is recommended precisely for plastic. Thus, an airtight connection between the top part and the bottom part to form the interior volume is obtained in a simple manner without a large amount of assembly equipment.

Another advantageous embodiment is that a seal is arranged between that part of the recess which belongs to the piston bottom part and the support. With such a simple design, in which an O-ring is preferably used as a seal, an airtight closure of the piston interior is obtained with little complexity.

Another advantageous embodiment is that the support is of substantially tubular design and is formed with offsets or flanges for positioning in the recess and, in its lower region, has an insert provided with a thread.

Another advantageous embodiment is that the piston bottom part is connected to the chassis via the support or via the insert provided with a thread. The support fitted into the receptacle or parts of the receptacle thus simultaneously serves as a connecting element for connection of the roll-off piston to the chassis or body. This in turn simplifies and facilitates the design and also allows securing against "lifting off" of the roll-off piston.

In this case, the insert can be designed as a metal threaded bush pressed into the support or as a metal threaded bolt pressed or screwed in. It is likewise possible, if appropriate as an additional measure, for the support itself to be provided on the underside thereof with receptacles or concave or domed recesses, possibly formed in a flange or base connected on the underside of the support and provided for connection to the chassis. This allows the transmission of compressive and transverse forces without additional elements and, given an appropriate embodiment, produces an annular force transmission surface which is also suitable for absorbing tilting moments transverse to the axis in interaction with a counterpart, arranged centrally in the region of the support part, of the chassis. Such an embodiment also serves furthermore for centering during assembly.

Another advantageous embodiment is realized in that the support is provided with a dished plate on the end of the rolling-lobe flexible member in order to receive the stop buffer. This simplifies the outlay on assembly or design for the air spring cover, that is, the upper air spring plate, and the support can be delivered as a single(-part) component with the stop buffer (reduction of individual parts). Of course, it is also possible, as has hitherto been customary in the case of similar designs in the prior art, for the stop buffer to be arranged on the inside of the air spring cover, with the result that the buffer lies opposite a stop flange, possibly in the form of a dished plate, on the upper side of the support.

As a particularly advantageous possibility, the roll-off piston according to the invention can be used in an air spring device for a vehicle. The roll-off piston according to the invention can also be used within an "air spring module", which also contains an air spring rolling-lobe flexible member and damper and is delivered ready for installation.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
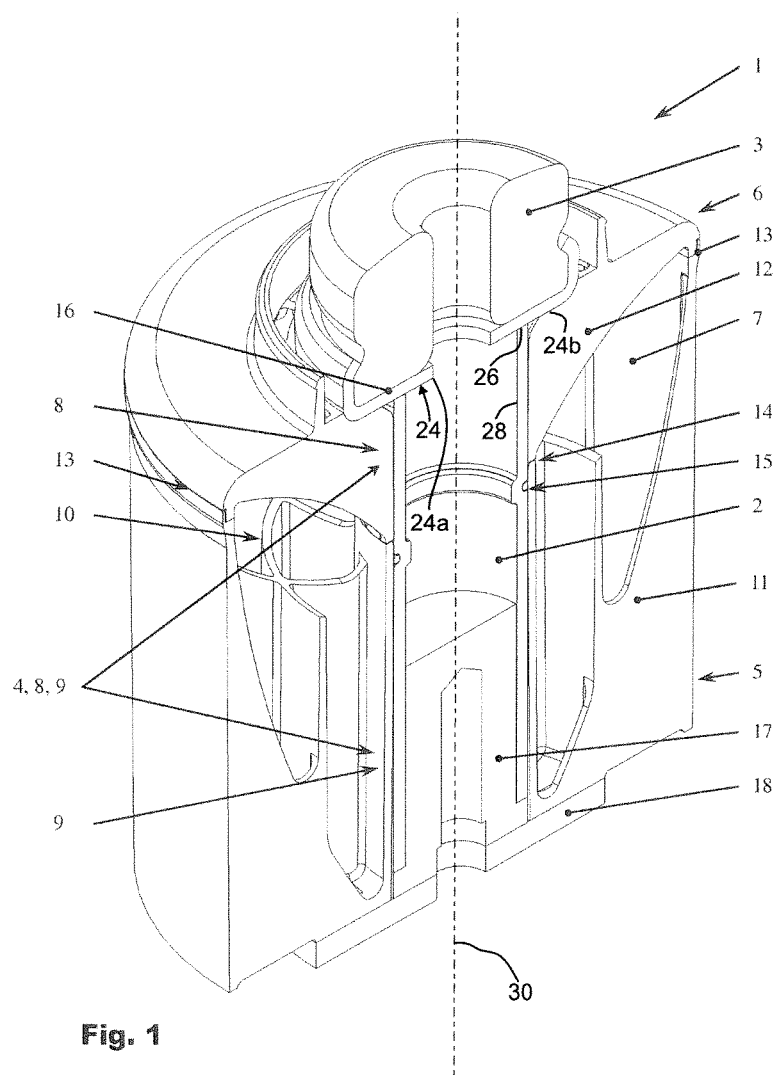
FIG. 1 is a perspective cutaway view of a roll-off piston according to the invention for an air spring.

FIG. 1 shows a roll-off piston 1 according to the invention configured as a hollow plunge piston for an air spring rolling-lobe flexible member on a commercial vehicle such as a truck. The roll-off piston has a centrally arranged support 2 for a stop buffer 3 acting in an axial direction of the air spring and in which the support 2 is made of steel, which has a significantly higher strength than the plastic of the roll-off piston. The support is received in a recess 4 in the roll-off piston 1. The recess is configured to be complementary to the shape of the support and is connected to the piston.

In this embodiment, the roll-off piston comprises a pot-shaped piston bottom part 5 and a piston top part 6 connected airtightly to the piston bottom part 5 and configured as a cover. The interior 7 of the roll-off piston 1 communicates with the interior of the air spring, more specifically, with the interior of the rolling-lobe flexible member.

The recess 4 is configured to be complementary to the shape of the support. A part 8 of the recess 4 is configured as part of the piston top part 6 and so as to start from the cover thereof, while another part 9 of the recess 4 is configured as part of the pot-shaped piston bottom part 5 and so as to start from the base thereof. Both parts 8 and 9 of the recess mutually adjoin and coact to receive the support 2.

The support 2 and the recess 4, that is, parts 8 and 9 of the recess, are of complementary tubular design and are arranged centrally within the roll-off piston 1.

The interior of the roll-off piston 1 is reinforced with rib-type reinforcing elements (10, 11, 12) arranged in an appropriate manner substantially in a star shape and/or ray shape in the annular spaces between the respective part 8 or 9 of the recess and the piston wall or cover wall.

The airtight connection 13 between the piston bottom part and the piston top part is formed at the outer piston shell, while the tubular parts of the recess merely abut one another, in this case in the internal connecting region 14.

Due to this "resting against one another", a seal is required. In the embodiment shown here, this seal is provided as an O-ring 15 and is arranged in a very simple manner between that part 9 of the recess, which belongs to the piston bottom part 5, and the support 2.

Here, the support 2 also is of substantially tubular configuration and is provided at the rolling-lobe flexible member end with a flange 16 in the form of a dished plate, which serves both for the vertical positioning of the support 2 and also to receive the stop buffer 3.

As FIG. 1 shows, the dished plate 16 includes a flat base 24 which is arranged on the end face 26 of the tubular support 2 so as to cause the flat base to overlap the annular wall 28 radially inwardly toward the longitudinal axis 30 and radially outwardly so as to position the stop buffer 3 above and in a two-sided overlapment with respect to the end face 26 of the annular wall 28 of the tubular support 2. FIG. 1 shows that flat base 24 straddles the annular wall 28 at its end face 26. Thus, annular portion 24a of flat base 24 overlaps the annular wall 28 radially inwardly toward the longitudinal axis 30 and annular portion 24b overlaps the annular 28 radially outwardly.

In its lower region, the support 2 has an insert 17, which is provided with a thread and via which the piston bottom part 5 is connected to the chassis by means of a screw or a threaded bolt (not shown), in this case using a correspondingly perforated disc 18 made of metal, which serves to ensure uniform distribution of the chassis forces to the base of the piston bottom part 5.

Figure 2:
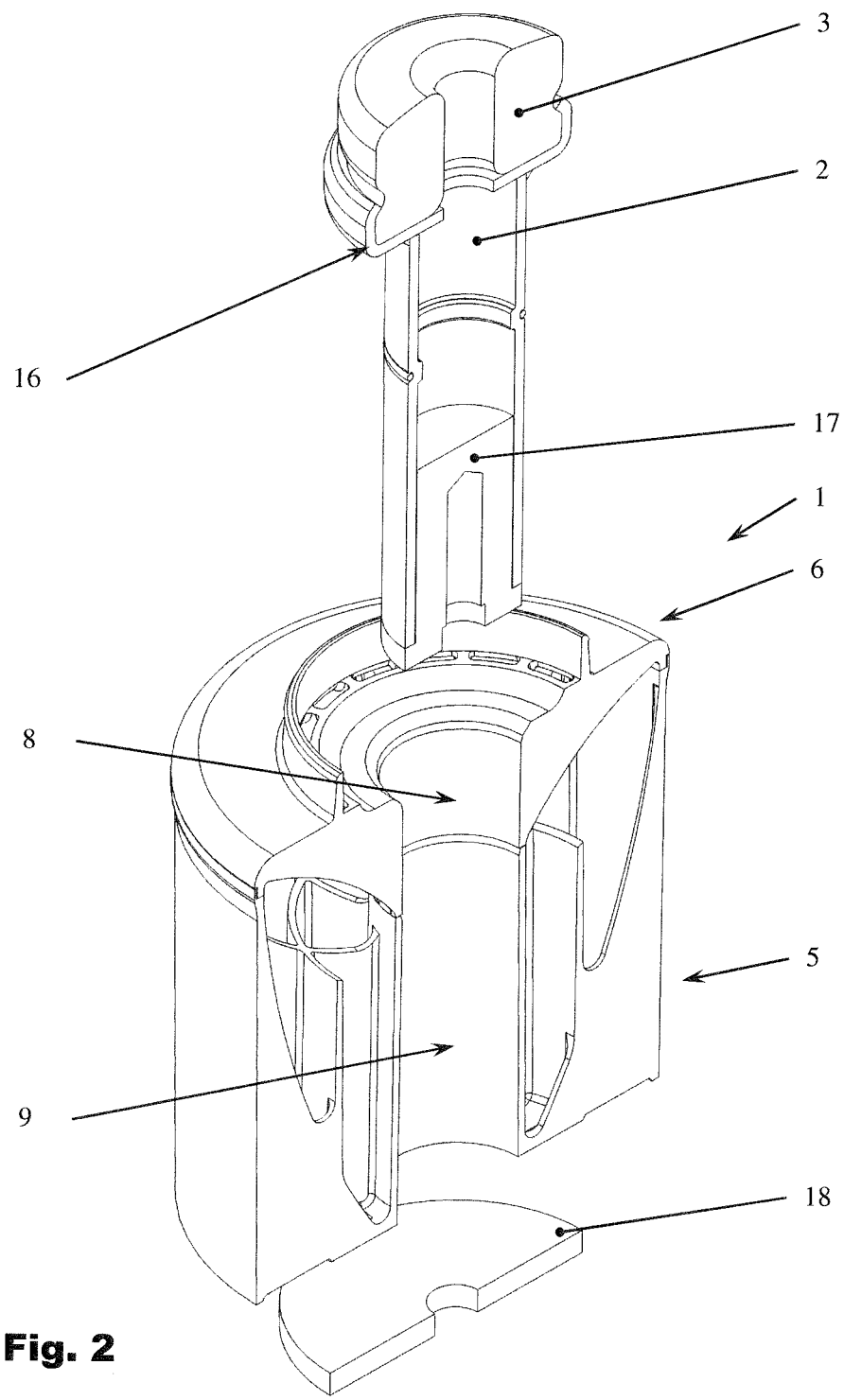
FIG. 2 shows the roll-off piston according to the invention in accordance with FIG. 1 in the form of an exploded drawing; and, FIG. 3 shows a partial assembly of a spring system having a roll-off piston according to the invention in accordance with FIG. 1.

FIG. 2 shows the roll-off piston 1 according to the invention in an exploded view wherein all the significant parts have been pulled out.

Figure 3:
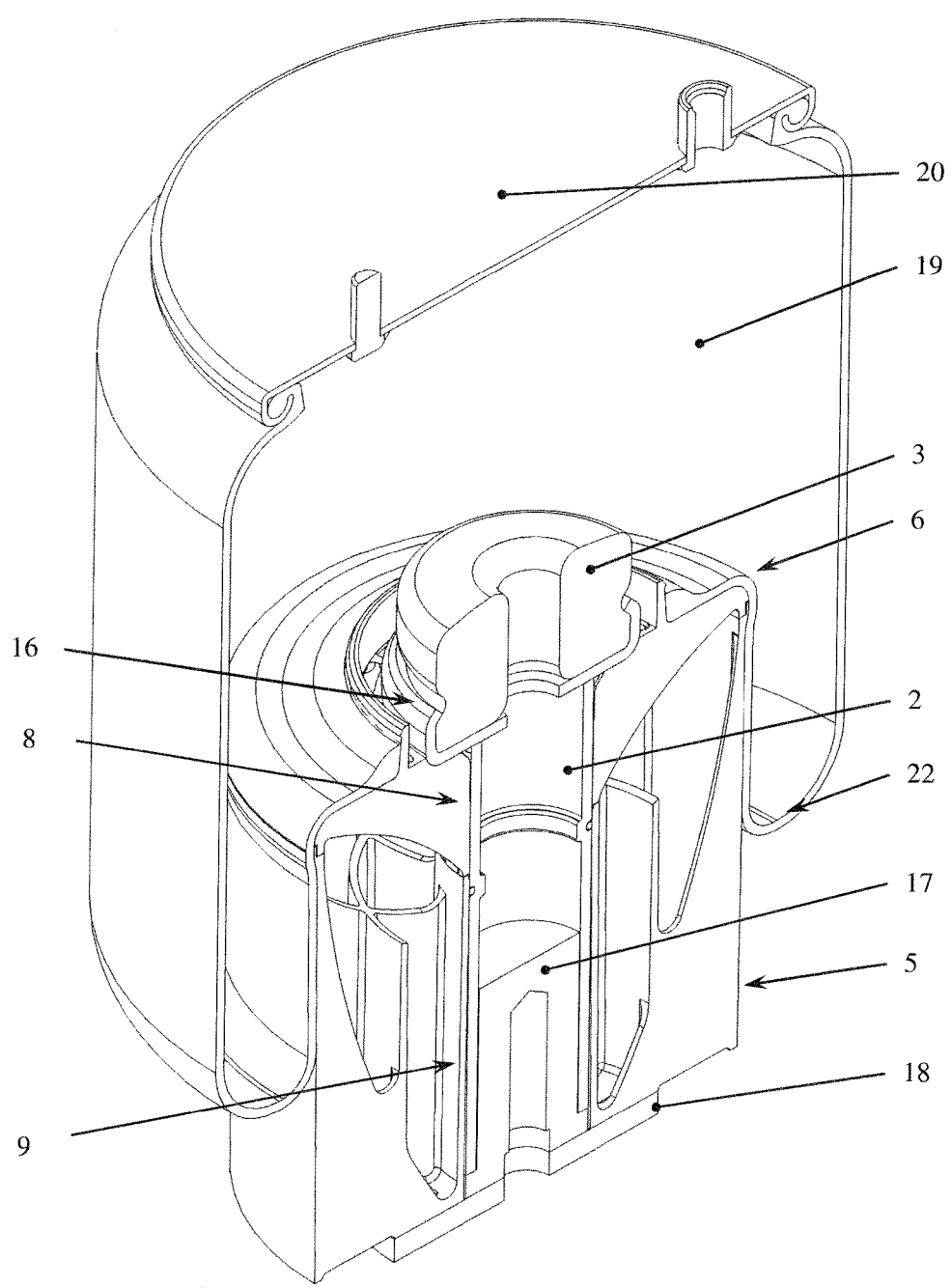

FIG. 3 shows a partial assembly of a spring system for an air spring unit for a vehicle, having a roll-off piston 1 in accordance with FIG. 1, the associated air spring rolling-lobe flexible member 19 and the air spring cover 20 provided with air feed devices.

The air spring rolling-lobe flexible member 19 is connected airtightly to the piston top part 6 at the roll-off piston 1 which is configured as a plunge piston. During deflection and rebound, the rolling-lobe flexible member rolls on the outer periphery or piston wall of the roll-off piston 1, forming a rolling lobe 22 as it does so.

Here, the air spring cover 20 is connected to a vehicle body (not shown), and the insert 17 is connected by means of a threaded bolt (not shown) to an associated chassis part/axle stub of the truck.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description 1 roll-off piston
2 support
3 stop buffer
4 recess
5 piston bottom part
6 piston top part
7 interior of the roll-off piston
8 part of recess
9 part of recess
10 reinforcing element
11 reinforcing element
12 reinforcing element
13 connection
14 internal connecting region
15 O-ring
16 flange in the form of a dished plate
17 insert
18 perforated disc
19 air spring rolling-lobe flexible member
20 air spring cover
22 rolling lobe

What is claimed is:

1. A plunge roll-off piston assembly for a rolling-lobe flexible member of an air spring, the air spring defining a longitudinal axis and having an interior space, the roll-off piston assembly comprising:

a roll-off piston made of plastic and defining a longitudinal axis;

a tubular support having a predetermined length and being defined by an annular wall concentric with said longitudinal axis and having an upper end face;

said tubular support being uninterrupted by openings therein over the entire length thereof;

a stop buffer;

a dished plate for accommodating said buffer therein;

said dished plate having a flat base arranged on said end face of said annular wall of said tubular support so as to cause said flat base to overlap said annular wall radially inwardly toward said longitudinal axis and radially outwardly so as to position said buffer above and in a two-sided overlapment with respect to said end face of said annular wall of said tubular support;

said tubular support being made of metal so as to have a significantly higher strength when compared to the plastic of said roll-off piston;

said roll-off piston having an annular outer wall and an annular inner wall concentric with respect to said annular outer wall and said longitudinal axis;

said inner wall having an inner wall surface defining a cylindrical opening extending along said longitudinal axis;

said cylindrical opening being configured to be complementary to the shape of said tubular support;

said tubular support being accommodated in said cylindrical opening so as to be connected to said roll-off piston in mutual surface-to-surface direct contact engagement in a form-fitting connection along the entire length of said tubular support;

said roll-off piston being configured as a hollow roll-off piston including:

a pot-shaped piston lower part having a base;

a piston upper part configured as a cover and connected airtight to said piston lower part;

said hollow roll-off piston having an interior space communicating with said interior space of said air spring;

a first part of said cylindrical opening being configured as part of said piston upper part and extending toward said piston lower part;

a second part of said cylindrical opening being configured as a part of said pot-shaped piston lower part and extending, starting from said base of said piston lower part, toward said piston upper part; and, said first and second parts of said cylindrical opening being mutually joined to define said cylindrical opening as a composite cylindrical opening accommodating said tubular support therein.

2. The plunge roll-off piston assembly of claim 1, wherein said interior space of said roll-off piston is stiffened with a plurality of stiffening elements.

3. The plunge roll-off piston assembly of claim 1, wherein said piston has an outer surface and the airtight connection between said piston lower part and said piston upper part is provided on said outer surface of said piston while said cylindrical opening parts lie directly one against the other.

4. The plunge roll-off piston assembly of claim 3, wherein said second part of said cylindrical opening and said tubular support conjointly define an interface; and, said roll-off piston further comprises a seal at said interface.

5. The plunge roll-off piston assembly of claim 4, wherein said metal is steel and said tubular support is arranged centrally with respect to said longitudinal axis.

6. The plunge roll-off piston assembly of claim 1, wherein said dished plate is configured to facilitate positioning said tubular support; and, said tubular support has a lower region and an insert having a winding disposed in said lower region.

7. The plunge roll-off piston assembly of claim 6, wherein said pot-shaped piston lower part is connected to a chassis via said tubular support.

8. The plunge roll-off piston assembly of claim 6, wherein said pot-shaped piston lower part is connected to a chassis via said insert having said winding.

9. The plunge roll-off piston assembly of claim 1, wherein said metal is steel.

10. An air spring for a motor vehicle, the air spring having an interior space and defining a longitudinal axis, the air spring comprising:
an air spring cover;
a plastic plunge roll-off piston;
a rolling-lobe flexible member connected between said air spring cover and said roll-off piston; and,
said roll-off piston including:
a tubular support having a predetermined length and being defined by an annular wall concentric with said longitudinal axis and having an upper end face;
said tubular support being uninterrupted by openings formed therein over the entire length thereof;
a stop buffer;
a dished plate for accommodating said stop buffer thereon;
said dished plate having a flat base arranged on said end face of said annular wall of said tubular support so as to cause said flat base to overlap said annular wall radially inwardly toward said longitudinal axis and radially outwardly so as to position said buffer above and in a two-sided overlapment with respect to said end face of said annular wall of said tubular support;
said tubular support being made of metal so as to have a significantly higher strength when compared to the plastic of said roll-off piston;
said roll-off piston having an annular outer wall and an annular inner wall concentric with respect to said annular outer wall and said longitudinal axis;
said inner wall having an inner wall surface defining a cylindrical opening extending along said longitudinal axis;
said cylindrical opening being configured to be complementary to the shape of said tubular support;
said tubular support being accommodated in said cylindrical opening so as to be connected to said roll-off piston in mutual surface-to-surface direct contact engagement in a form-fitting connection along the entire length of said tubular support;
wherein said plunge roll-off piston is configured as a hollow plunge roll-off piston comprising:
a pot-shaped piston lower part having a base;
a piston upper part configured as a cover and connected airtight to said piston lower part;
said plunge roll-off piston having an interior space communicating with said interior space of said air spring;
a first part of said cylindrical opening being configured as part of said piston upper part and extending toward said piston lower part;
a second part of said cylindrical opening being configured as a part of said pot-shaped piston lower part and extending, starting from said base of said piston lower part, toward said piston upper part; and,
said first and second parts being mutually joined and coacting to accommodate said tubular support.

11. The air spring of claim 10, wherein said metal is steel and said tubular support is arranged centrically with respect to said longitudinal axis.

12. The air spring of claim 11, wherein said tubular support and said cylindrical opening are configured to be arranged centrically within said roll-off piston.

13. The air spring of claim 12, wherein said roll-off piston has an interior space; and, said interior space of said roll-off piston is stiffened with a plurality of stiffening elements for imparting lateral support to said first and second parts of said cylindrical opening.

14. The air spring of claim 10, wherein said piston has an outer surface and the airtight connection between said piston lower part and said piston upper part is provided on said outer surface of said piston while said first part of said cylindrical opening and said second part of said cylindrical opening lie one against the other.

15. The air spring of claim 14, wherein said second part of said cylindrical opening and said tubular support conjointly define an interface; and, said plunge roll-off piston further comprises a seal at said interface.

16. The air spring of claim 10, wherein said dished plate is configured to facilitate positioning said tubular support; and, said tubular support has a lower region and an insert having a winding disposed in said lower region.

17. The air spring of claim 16, wherein said pot-shaped piston lower part is connected to a chassis via said tubular support.

18. The air spring of claim 16, wherein said pot-shaped piston lower part is connected to a chassis via said insert having said winding.

* * * * *